United States Patent [19]

Wadia et al.

[11] 3,919,523

[45] Nov. 11, 1975

[54] ELECTRIC COOKING APPARATUS WITH SAFETY CONTROL

[75] Inventors: Gurinder S. Wadia, Carpentersville; Harnek S. Gill, Algonquin, both of Ill.

[73] Assignee: McGraw-Edison Company, Elgin, Ill.

[22] Filed: Dec. 23, 1974

[21] Appl. No.: 535,572

[52] U.S. Cl. .................... 219/494; 99/337; 99/403; 219/441
[51] Int. Cl.[2] .......................................... H05B 1/02
[58] Field of Search ........... 219/435, 436, 437, 441, 219/442, 494, 523; 99/325, 327, 337, 403, 411

[56] References Cited
UNITED STATES PATENTS

| | | | |
|---|---|---|---|
| 3,217,633 | 11/1965 | Anetsberger | 99/327 |
| 3,242,849 | 3/1966 | Wells | 99/411 |
| 3,410,199 | 11/1968 | Quednau | 99/403 |
| 3,720,155 | 3/1973 | Fritzsche | 99/337 |
| 3,824,373 | 7/1974 | Napier | 219/494 |

*Primary Examiner*—Volodymyr Y. Mayewsky
*Attorney, Agent, or Firm*—Charles F. Lind

[57] ABSTRACT

The improved operating-safety control uses an operating contactor and a safety contactor each having normally open switch contacts and means connect these switch contacts on opposite sides of and in main power series circuits with the electric heating elements of the cooking apparatus effective for controlling electric input to same. An actuating coil is effective for closing each contactor switch contacts, and the control includes an operating thermostat and a safety thermostat each having a heat sensor in the cooking environment and each having a heat sensor in the cooking environment and each having normally closed contacts opened responsive to a set sensed high temperature. The control connects main on and off switch means operatively in series with a parallel hookup connection of the safety contactor actuating coil as one leg and the serially connected operator contactor actuating coil and operating thermostat controlled contacts as the other leg. Thus actuation of said main on and off switch means effectively opens and/or closes the switch contacts of both contactors. The control further connects the safety thermostat controlled contacts operatively with a power series connection through said mentioned parallel hookup connection and in series with the main on and off switch means and operates responsive to the opening of said contacts for deenergizing the actuating coils of both contactors, and means hold the safety thermostat controlled contacts open until reset means is actuated. A signal device is hooked across the main power input lines at locations between the safety contactor switch contacts and heating elements effective to indicate both a power on condition and a faulted closed condition of the operating and/or safety contactor switch contacts.

6 Claims, 4 Drawing Figures

ELECTRIC COOKING APPARATUS WITH SAFETY CONTROL

This invention relates to a control circuit for automatically deenergizing electric heating elements operating in a cooking environment, such as in an electric deep fat fryer or in an electric oven, responsive to an over temperature condition.

In restaurant cooking equipment, such as deep fat fryers for example, there is normally a container filled with cooking fat heated to a set cooking temperature, most often in excess of 250°F, and an operating thermostat sensing the cooking fat temperature cycles the heating means on and off to maintain the set temperature. In an electric deep fat fryer, power to the electric heating elements is controlled by a contactor having a set of high capacity contacts opened and/or closed by a coil connected in a low power control circuit with a set of switch contacts actuated by the operating thermostat. Most safety regulations further require a high temperature safety control which functions if the operating control fails and which is designed to terminate input power only if high unsafe temperatures are sensed.

U.S. Pat. No. 3,824,373 issued July 16, 1974, to Clarence H. Napier illustrates a safety control circuit for a deep fat fryer which incorporates two control contactors each having high-current contacts connected in series with the heating elements, and the operating coils for the separate contactors are controlled, respectively, by the operating thermostat and by a high temperature safety thermostat. However, since the safety contactor contacts are never shifted except responsive to an over temperature condition, if the contacts should become fused together, the fact that the safety thermostat signalled an unsafe condition would not necessarily assure that input power to the heating elements had been terminated.

This invention represents not only a more reliable safety control but also a control that during normal use is continuously being checked as to its workability, and this confidently assures the users that the same is operating satisfactorily.

The disclosed safety control uses a safety contactor having high-current contacts in a series power connection with the heating elements and further provides that these contactor contacts are shifted responsive to an over temperature condition and moreover everytime the main power control switch is opened. Moreover a signal device is connected across the main power lines between the safety contactor high-current contacts and the heating elements operable to detect the "on" power input condition to the heating elements and further to detect malfunctioning fused closed contacts of the safety contactor. This allows for continuous appraisal of the proper working condition of the safety contactor even though it might never have been activated responsive to a non-safe condition.

One embodiment of the subject invention provides a safety thermostat of the manual reset type, so that once it has been triggered responsive to an over temperature condition it must be manually reset in order to have input power to the heating elements.

Another embodiment of the subject invention has operating and safety relays in the control circuit and manually actuated start and stop control buttons connected respectively to normally open start switch contacts and normally closed stop switch contacts. These control buttons can be located on a front panel of the fryer unit forward of the cooking fat container holding the normally high temperature fat. Further, the energized safety relay holds the fryer unit in a power off inoperative condition responsive to a sensed over temperature condition, and the stop button must first be manually shifted to release this activated safety relay and the start switch button must then be shifted before subsequent use of the fryer can be started, and only then if the cooking fat as sensed by the safety thermostat has sufficiently cooled.

This invention will be more fully understood and appreciated after reviewing the following specification, the accompanying drawings forming a part thereof, wherein.

Figure 1:
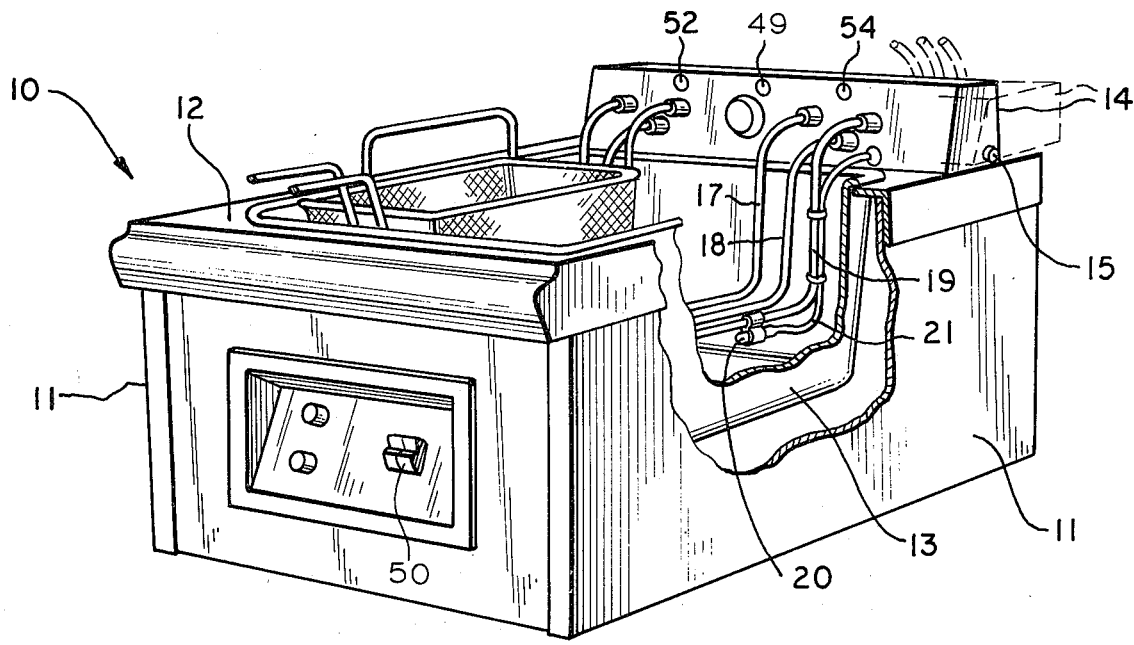
FIG. 1 is a perspective view, partly broken away and in section 1 of a typical commercial deep fat fryer shown with a first embodiment of the subject invention incorporated therein.

In FIG. 1, frying apparatus 10 is shown having a structurally rigid housing including side walls 11 and an upper panel 12 with an opening for receiving and holding open top fat container 13 at the upper peripheral lip portion thereof. A box-like control head 14 is located at the rear of the upper panel hinged at pins 15 to be swung between the operating position as shown and a tilted back position (shown in phantom).

Electric heating elements 17, 18, and 19 are mounted structurally from the control head and are bent downwardly to extend toward the bottom of the fat container 13 and forwardly to traverse the container for heating cooking oil contained therein. The tilted back support of the control head allows for the removal of the otherwise rigid heating elements from within the container, and the removal of the container completely from the housing for changing the fat or otherwise cleaning or servicing the fryer. The heating elements shown are typically of a sheathed type, and the general practice is to use three such elements for ready use of the fryer on three phase power electrical inputs and to stagger them side by side for compact arrangement.

There also is a thermostat control typically of the sealed hydraulic type having a sensing bulb strapped to the heating element in a manner to sense both the temperature of the fat in the container and the temperature of the heating element should there accidently be no fat covering the heating element. A capillary tube connects the bulb to an actuating bellows which expands and contracts as the temperature of the bulb varies, and the bellows movement opens and closes a set of switch contacts which is used to control the power input to the heating elements. The bellows and switch contacts are mounted in the control head and the sensing bulb is mounted on a heating element, and such location is typical with a thermobulb type thermostat to minimize repeated flexture of the connecting capillary tube. In the subject disclosure, one thermostat control with its bulb 20, connecting capillary tube 21, bellows 22 and operated switch contacts 23 is associated with the normal operating on-off cycling of the heating elements whereby the temperature can be adjustably set as required to within the operating range of 250°F to 400°F, for example, whereas a second thermostat control and its bulb 25, connecting capillary tube 26, bellows 27 and operated switch contacts 28 is used only to sense over temperature conditions which are deemed unsafe for consistant use, and this high limit should not exceed 475°F.

Figure 2:
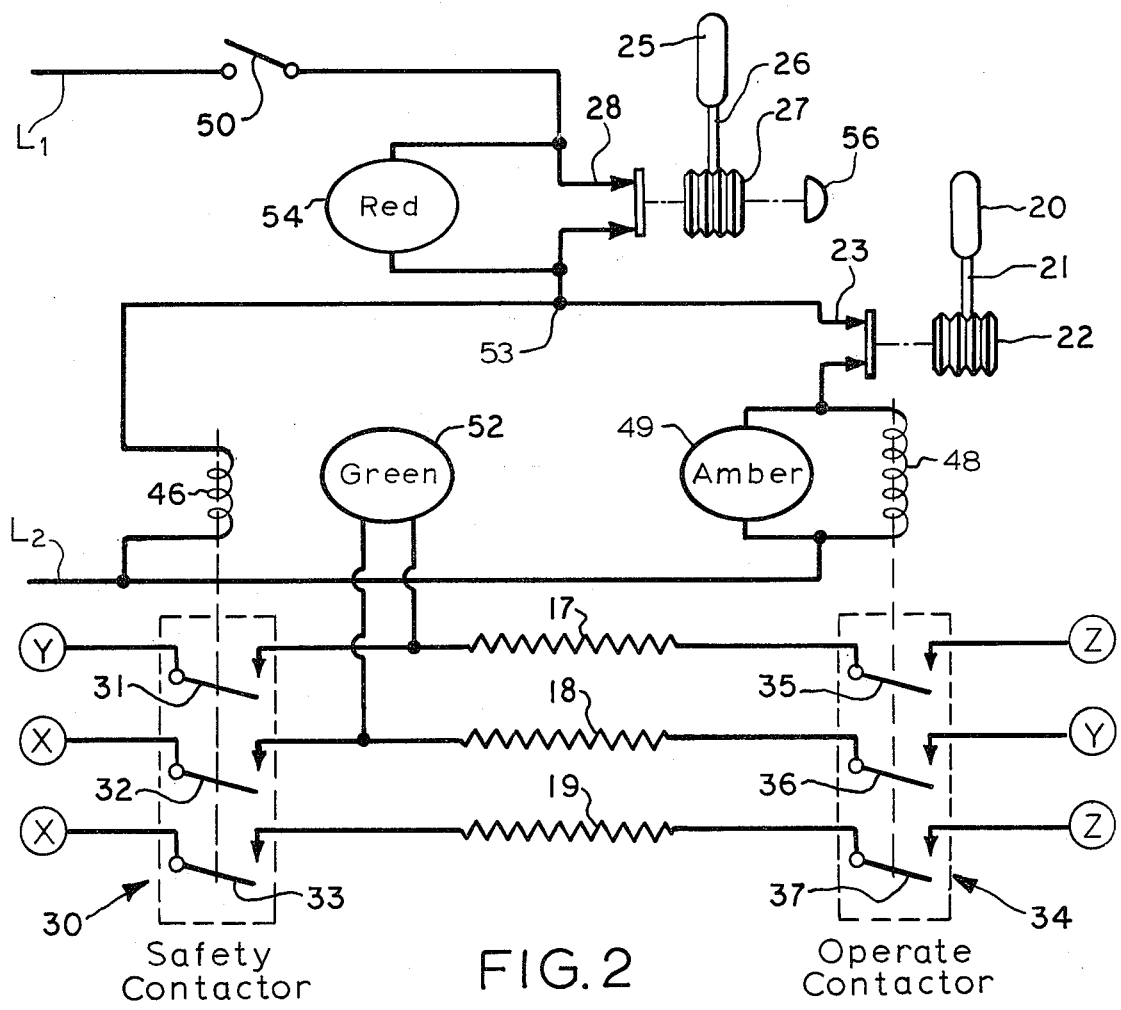
FIG. 2 is a schematic of the first embodiment electric control circuit incorporated in the fryer illustrated in FIG. 1.

Referring to FIG. 2, the heating elements 17, 18, and 19 are shown in an appropriate power series circuits with three-phase power lines X, Y, and Z and spaced contactors 30 and 34 having separate operating high capacity contacts (31, 32, and 33) and (35, 36, and 37) respectively. The three-phase power circuit has full voltage for example 208, 240, or 480 volts depending on power requirements of the heating elements across any two lines XY, ZY, or XZ. The series power circuit through contactors 30 and 34 and the heating elements 17, 18, and 19, provide that the opening of the contacts of either contactor terminates the energy input from the power lines X, Y, Z to and through the heating elements.

In the subject disclosure, there are two embodiments and where appropriate like components shown in the respective embodiments are illustrated with identical numbers. Each contactor has an actuating coil which is connected in the control system and which upon being energized closes the contacts of the respective contactor. In this regard, coil 46 is operatively associated with the contactor 30 and coil 48 is operatively associated with the contactor 34. Also in connection with the common components, an indicator light 49 of amber color is connected in parallel across the coil 48 of the operating contactor 34, and an indicator light 52 of green color is connected across the power input lines X and Y as shown at a location between the heating elements 17 and 18 and the operating contacts 31 and 32 of the safety contactor 30.

Referring first to FIG. 2 for a more detailed description of the first operating circuit, there is provided a main on/off switch 50 having separable contacts which can be permanently held closed or permanently held open, and the switch is in a series circuit from power line L1 through the contacts 28 of the safety thermostat control to junction point 53, where the circuit breaks into two parallel legs to power line L2, one leg including the actuating coil 46 of the safety contactor 30 and the other leg including the series connection of the operated switch contacts 23 of the operating thermostat and the coil 48 of the operating contactor 34.

Power lines L1 and L2 can be identical to any two of power lines X, Y, or Z; or can be at a lower voltage resulting from a step down tranformer (not shown), connection with these lines, depending on the local code requirements or on the preference of the installer. Red indicator light 54 is connected in a parallel hookup across the controlled switch contacts 28 of the safety thermostat control and the same is of such high resistance so that in the normal contacts closed condition there is insufficient current draw to light the indictor light, whereas with the switch contacts 28 open there is sufficient draw to light the indicator light 54 but not enough to energize either actuating coil 46 or 48.

The safety thermostat bellows arrangement is preferably of the type that actuation of the bellows 27 in a manner to open the switch contacts 28 throws an overcenter toggle or the like (not shown) to preclude back movement or closing of the contacts 28 incident to a cool down of the sensed temperature; instead the contacts must be manually shifted such as by actuation of control button 56 for instituting a restart condition of the circuit.

In normal operation of the control circuit indicated in FIG. 2, it will be appreciated that the safety contacts 28 are closed as are normally the operating thermostat contacts 23. Consequently with power in the lines X, Y, and Z, and L1 and L2, closing the main on-off switch 50 simultaneously energizes the actuating coils 46 and 48 of the respective safety and operating contactors 30 and 34 to bring main-line power through the heating elements 17, 18, and 19. At this time the amber indicator light 49 glows indicating that the operating contactor 34 is closed, and the green indicator light 52 glows indicating that likewise the safety contactor 30 is closed. Power is thus carried to the heating elements until the time that the operating thermostat bulb 20 senses the set high temperature and actuates bellows 22 to open the contacts 23 and thereby deenergize the actuating coil 48 and indicator light 49, and thereby open the contactor switches 35, 36, and 37 to deenergize the heating elements. The green indicator light 52 remains on since the safety contactor 30 through energized actuating coil 46 is still closed.

Under normal use the operating thermostat thus cycles to energize and deenergize the heating elements sufficient to satisfy the demand. Should however the contactor 34 or the operating thermostat fail and an over temperature condition be reached, the safety thermostat is activated to open the safety thermostat control contacts 28 to cut power to both actuating coils 46 and 48 of the respective contactors.

When the contacts 31, 32, and 33 open, main power to the heating elements is cut off to stop further heating of the cooking oil. Opening of contacts 28 turns red signal light 54 on indicating an over temperature condition of the cooking oil.

In as much as under normal operation an over temperature condition will not be reached except by the malfunction of the operating contactor 34, the green signal light 52 shall still remain on because of leakage current through closed contacts 35 and 36 and the heating elements 17 and 18. This indicates that main power to the unit is still on; however, this leakage current is insufficient for significant operation of the heating elements and the oil thus cools down.

Power can only be restored by manually resetting the safety control, by depressing the button 56, but this is only after sufficient cool down of the cooking oil, and this closes the safety thermostat control contacts 28 and reenergizes the actuating coils 46 and 48 of the respective safety and operating contactors 30 and 34. If the subsequent operation results in another over temperature condition, the operator is clearly appraised of malfunctioning equipment and can arrange for service of same.

Of significance in the subject invention is the fact that the main on-off switch 50 and the safety control thermostats 28 are effectively in series and each is effectively in a parallel hookup with the actuating coils 46 and 48 and the contactors. This means that each of the contactors is actuated responsive to the operator opening the on-off switch 50 such as at the end of the cooking day. Consequently both contactors should open and should take power away from the heating elements, and the green light 52 should thus turn off. If the safety contactor 30 should malfunction fused closed, then a circuit is established from lines X and Y through the closed contacts 31 and 32 to the indicator 52, and the illuminated indicator warns the operator that such a malfunction exists and repair of same is in order. It should be appreciated that the contactors are of such physical construction that should any pair of separate contacts become fused together none of the contacts can be separated since the operating mechanism of the contacts acts in unison responsive to the single pull of the actuating coil and/or of a return spring not shown.

Figure 3:
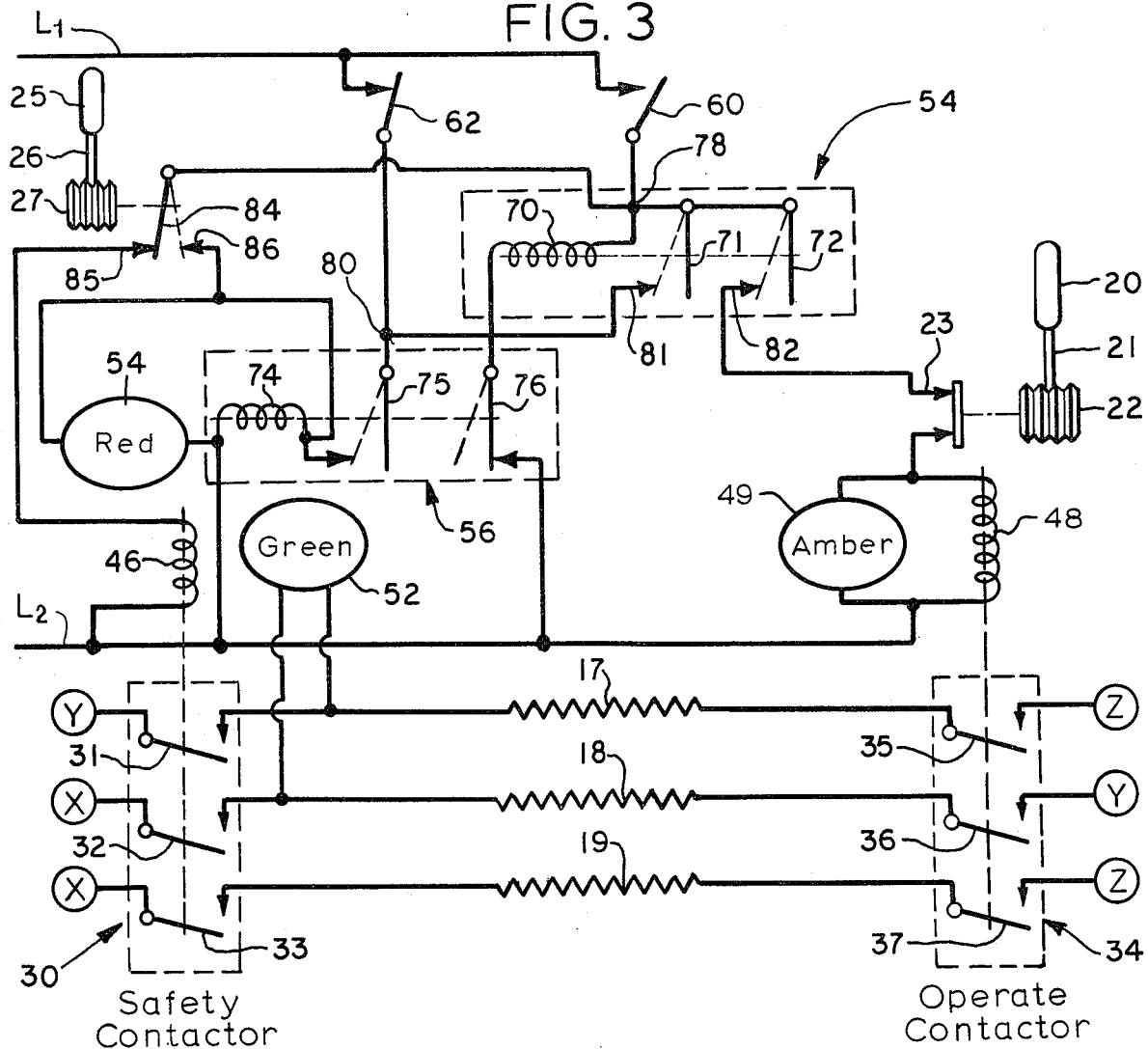
FIG. 3 is a schematic of a second embodiment of an electric control circuit suited for incorporation in a fryer.
Figure 4:
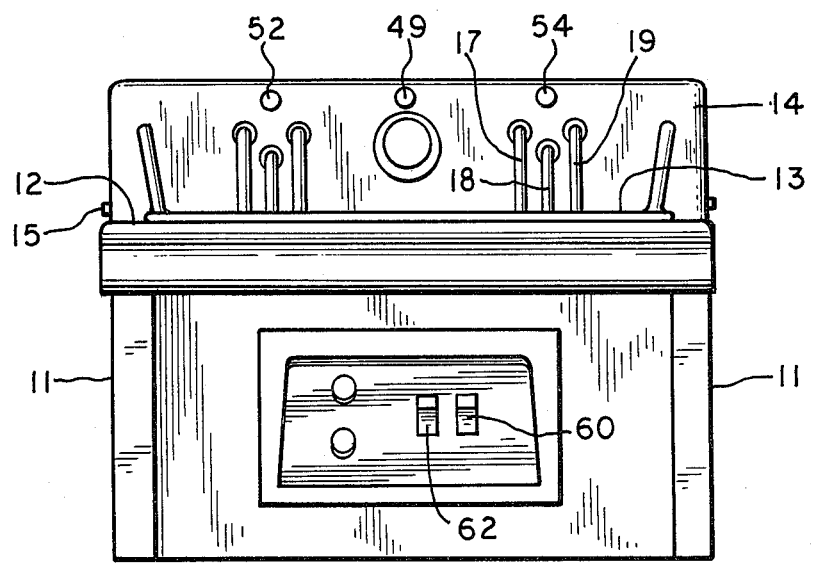
FIG. 4 is a front elevational view of the fryer utilizing the control of FIG. 3.

A second embodiment of the invention is disclosed in FIG. 3, and this embodiment uses a thermostat of the automatic resetting type and the control itself acts to maintain the thermostat disabled until a reset device is manually actuated. Thus there is provided normally opened start switch 60 and normally closed stop switch 62; and there further is provided an operate relay 54 and the safety relay 56. The relays are typical construction and have a pair of movable leaf switches each which can be connected across opposing contacts for completing or breaking circuits through the moving leaf, and an actuating coil is used to shift the movable leaf. Specifically, the operate relay has actuating coil 70 and a pair of moving leafs 71 and 72; whereas the safety relay has actuating coil 74 and a pair of moving leafs 75 and 76. The start and stop switches can be located on the front wall of the fryer forward of the fat container to allow an operator to actuate them without reaching over the fat container.

The control circuit is completed, upon a momentary closing of the start switch 60, from the line L1 through the switch 60 to junction 78, and through operate relay coil 70 and closed leaf contact 76 to the line L2. The energized coil 70 shifts the leaf contacts 71 and 72 closed, whereupon a holding circuit is maintained through the normally closed stop switch 62 to junction 80, and through the now closed leaf 71 to the junction 78 and through the energized operate relay coil 70 as noted. The power at the junction 78 further is carried by the now closed leaf 72 through the operating thermostat switch contacts 23 and the actuating coil 48 of the operating contactor 34 to line L2. Power is carried further from the common hot junction 78 and across the safety control thermostat switch leaf 84 and engaged contact 85 through the actuating coil 46 of the safety contactor 30 to line L2. Consequently upon the operate relay being energized, circuits are completed through the respective actuating coils 46 and 48 to shift the contactors 30 and 34 thereby applying power through the heating elements 17, 18, and 19. During this power on condition the amber light 49 glows because of the energized coil 48; and the green indicator light 52 glows because of the closed safety contactor contacts. Also, cycling of the operating thermostat contacts 23 as dictated by demand cycles the heat elements on and off.

The safety thermostat as noted includes a movable leaf 84 which responsive to the sensing bulb 25 indicating the set oversafe temperature is shifted from against contact 85 to against normally open contact 86 and this brings power through the safety relay coil 74 to line L2, and this further illuminates red indicator light 54 in a parallel hookup connection with the coil 74. Upon the safety relay coil 74 being energized, the leaf contacts 75 and 76 are shifted and the opened leaf 76 breaks the circuit through the operate relay coil 70 to deenergize the operate relay and thus allow the leaf contacts 71 and 72 to return to their positions as shown; and secondly establishes a safety relay hold circuit through coil 74 by means of the closed leaf 75 to junction 80 and through the normally closed stop switch 62.

The thus opened leaf contacts 71 and 72 deenergize both actuating coils 46 and 48 of the safety and operate contactors respectively and thereby terminates power input to the heating element. The energized safety relay maintains the operate relay deenergized and the latter cannot be energized unless and until the safety relay is first deenergized, and this can only happen after the cooking oil has cooled sufficiently to allow the contact 84 to shift back against contact 85 and then subsequent to this condition of manually opening stop switch 62. Thus when the safety relay coil 74 is energized, the unit cannot be started by closing the start switch 60, and likewise during the unsafe condition when the over temperature condition exists and contact 86 is engaged by moving leaf 84, the safety control cannot be deenergized merely by opening the stop switch 62 . . . since immediately upon the same closing the stop relay will then be reenergized. The deenergized safety control relay allows the safety relay leafs 75 and 76 to shift to their normal positions shown, so that a subsequent cycle can be instigated upon momentarily closing the start control switch 60.

What is claimed is:

1. In an electric cooking unit having electric heating elements disposed to heat a cooking environment, an improved operating-safety circuit comprising main on and off switch means, an operating contactor and a safety contactor each including normally open switch contacts and an actuating coil effective for closing same, an operating thermostat and a safety thermostat each having a heat sensor in the cooking environment and each having normally closed contacts opened responsive to the sensed set high temperature, means connecting the operating contactor switch contacts and the safety contactor switch contacts on opposite sides of and in main power series circuits with the heating elements effective for controlling electric input to same, an operate control including means connecting the main on and off switch means operatively in series with a parallel hookup connection of the safety contactor actuating coil as one leg and the serially connected operator contactor actuating coil and operating thermostat controlled contacts as the other leg, so that actuation of said main on and off switch means simultaneously energizes and deenergizes both actuating coils and thereby opens and closes the switch contacts of both contactors, a safety control including means connecting the safety thermostat controlled contacts operatively with the power series connection through said mentioned parallel hookup connection and in series with the main on and off switch means operable responsive to the opening of said contacts for simultaneously deenergizing the actuating coils of both contactors, means effectively holding said parallel hookup connection open and manual reset means for releasing the said holding means, and a signal device hooked across the main power input lines at locations between the safety contactor switch contacts and heating elements effective to indicate both a power on condition and a faulted closed condition of the safety and operating contactor switch contacts.

2. An operating safety circuit according to claim 1, wherein the means effective for holding the parallel hookup connection open includes having the safety thermostat of the type that remains in its set position until shifted by an outside force so that once the same has been operated responsive to the set high temperature and the thermostat contacts are opened and the same contacts remain open until manually reset by actuation of the reset means.

3. An operating safety circuit according to claim 1, wherein the means effective for holding the parallel hookup connection open includes a safety relay having a coil in a circuit including normally opened contacts of the safety thermostat which relay is energized upon a sensed over temperature condition and said relay having normally closed contacts opened upon the energization of the relay coil, and means operatively connecting the said normally closed relay contacts in a circuit that precludes actuation of operate contactor actuating coil.

4. An operating safety circuit according to claim 3, wherein the means precluding actuation of the operate contactor actuating coil includes an operate relay having a coil operatively connected in series with the safety relay normally closed contacts and having normally open contact means operatively connected in series with the operating contactor actuating coil, effective when the safety relay is energized to preclude energization of the operate relay and thus the actuation of the operating contactor actuating coil.

5. An operating safety circuit according to claim 3, wherein circuit means is provided through the safety relay normally opened contact means and the safety relay coil and the main on and off switch means effective when the safety relay is energized to hold the same as such until it is released by actuation of the main on and off switch means.

6. An operating safety circuit according to claim 5, wherein said cooking unit is a deep fat fryer having a cooking container for the fat and a wall forwardly disposed from the cooking container, and wherein said main on and off switch means is located on the said forwardly disposed wall to allow actuation of same without reaching over the cooking container.

* * * * *